(12) United States Patent
Hannan et al.

(10) Patent No.: US 6,240,778 B1
(45) Date of Patent: Jun. 5, 2001

(54) LIQUID LEVEL POINT SWITCH SENSOR

(75) Inventors: Alan R. Hannan; Thomas M. Nickolin, both of Cincinnati; Bryan H. McQuitty, Batavin; William E. Atkinson; J. Jacob Noble, both of Cincinnati, all of OH (US)

(73) Assignee: KDI Precision Products, Inc., Cincinnati, OH (US)

( * ) Notice: Subject to any disclaimer, the term of this patent is extended or adjusted under 35 U.S.C. 154(b) by 0 days.

(21) Appl. No.: 09/033,271

(22) Filed: Mar. 2, 1998

(51) Int. Cl.$^7$ ............................ G01F 23/00; G01F 23/26; G01R 27/26
(52) U.S. Cl. .................... 73/304 C; 73/304 R; 324/664; 324/689; 324/690; 324/694; 324/696; 324/697
(58) Field of Search ..................... 324/664, 690, 324/689, 694, 696, 697; 73/304 R, 304 C

(56) References Cited

U.S. PATENT DOCUMENTS

| | | | |
|---|---|---|---|
| 2,648,058 | 8/1953 | Breedlove | 340/870.35 |
| 2,651,940 | 9/1953 | Kline | 73/304 C |
| 2,751,531 | 6/1956 | Barrett | 361/284 |
| 2,866,337 | 12/1958 | Minneman et al. | 73/304 C |
| 2,868,015 | 1/1959 | Haropulos | 73/304 R |
| 3,391,547 | 7/1968 | Kingston | 62/218 |
| 3,620,080 | 11/1971 | Ryder | 73/304 C |
| 4,086,528 | 4/1978 | Walton | 321/671 |
| 4,194,395 * | 3/1980 | Wood | 73/304 C |
| 4,266,144 | 5/1981 | Bristol | 307/116 |
| 4,417,472 * | 11/1983 | Tward | 73/304 C |
| 4,470,008 | 9/1984 | Kato | 324/61 R |
| 4,499,766 | 2/1985 | Fathauer et al. | 73/304 C |
| 4,545,020 | 10/1985 | Brasfield | 364/509 |
| 4,553,434 | 11/1985 | Spaargaren | 73/304 C |
| 4,589,077 | 5/1986 | Pope | 364/509 |
| 5,012,197 * | 4/1991 | Seiffert et al. | 324/696 |
| 5,052,223 * | 10/1991 | Regnault et al. | 73/304 C |
| 5,142,909 | 9/1992 | Baughman | 73/304 C |
| 5,406,843 | 4/1995 | Hannan et al. | 73/304 C |
| 5,437,184 | 8/1995 | Shillady | 73/304 C |

* cited by examiner

Primary Examiner—Hezron Williams
Assistant Examiner—Dennis Loo
(74) Attorney, Agent, or Firm—Harness, Dickey & Pierce, PLC

(57) ABSTRACT

A liquid level sensor for detecting when an upper level of a liquid in a reservoir has reached a predetermined or critical point in the reservoir. The sensor includes a first input plate and a second input plate disposed concentrically relative to the first input plate. Each of the input plates are further of a shape such that an imaginary line extending through the centroid of the first input plate divides each of the first and second input plates approximately in half. An output or receiver plate is positioned closely adjacent the two input plates. The input plates are further disposed in the reservoir such that the centroid is at the predetermined or critical level in the reservoir. The two input plates are alternately electrically excited and the signals coupled to the output plate are detected and repeatedly compared against one another. The output signals will differ in magnitude because of the difference in the dielectric constant of air and the liquid in the reservoir. As the liquid level in the reservoir approaches the predetermined or critical point, the output signals coupled onto the output plate begin approaching one another. When the liquid level reaches the predetermined or critical point, the output signals are approximately equal in magnitude. A microcontroller detects this condition and generates a signal in response thereto. The performance or accuracy of the sensor is independent of changes in the dielectric constant of the fluid and, in some cases, is not affected by tilting or other changes in the orientation of the reservoir which might otherwise affect the accuracy of measurements taken by other forms of liquid level sensing devices.

22 Claims, 3 Drawing Sheets

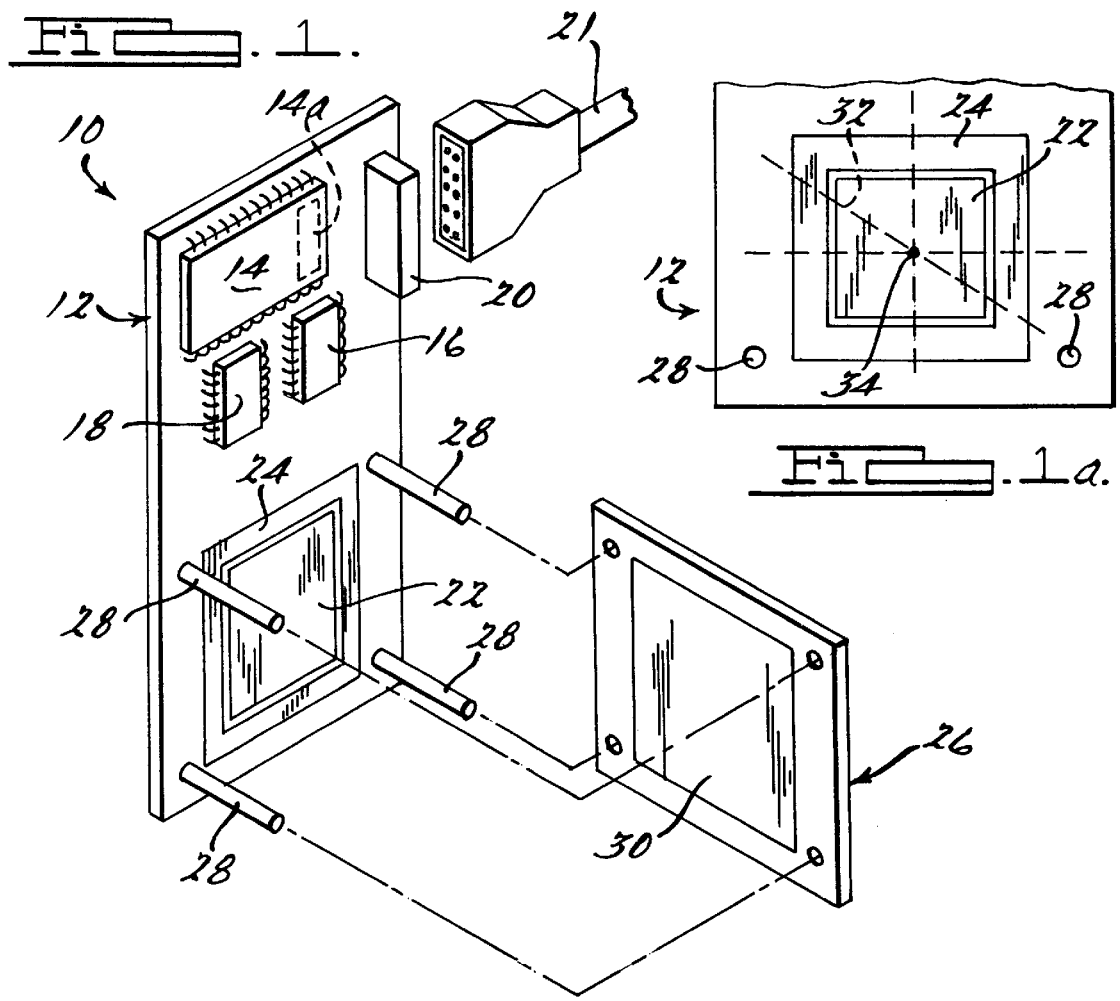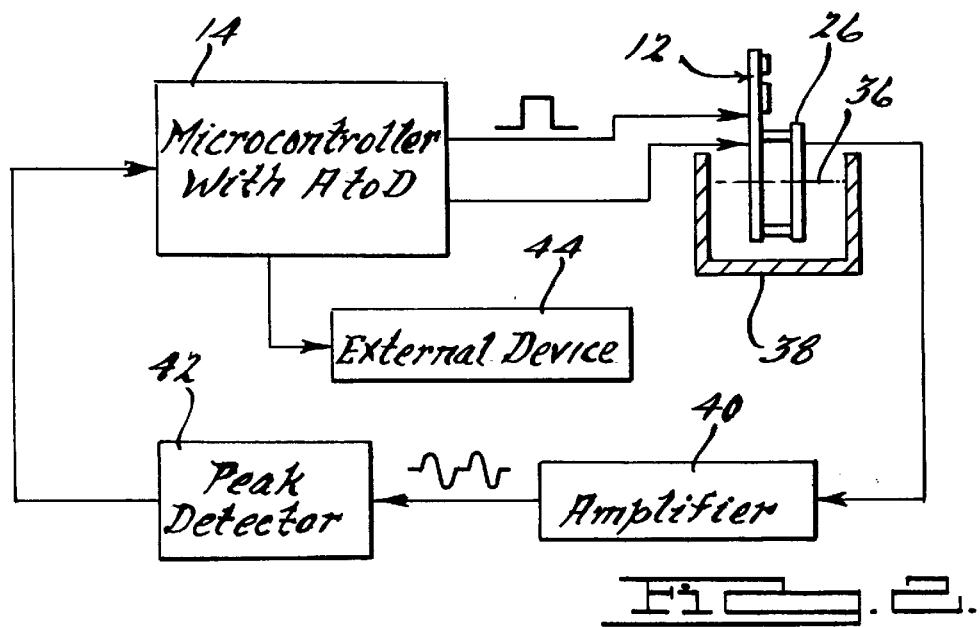

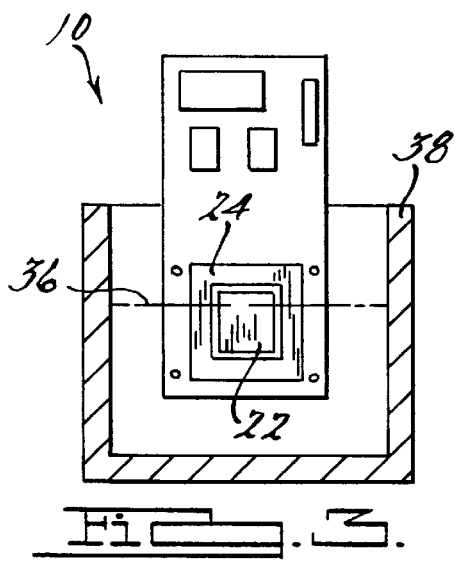
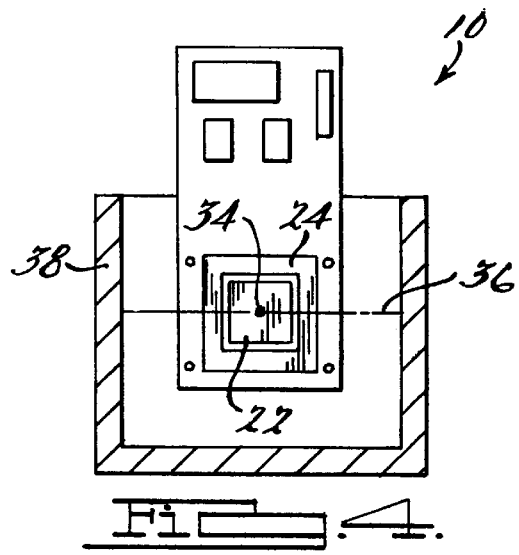
Fig. 3.  Fig. 4.
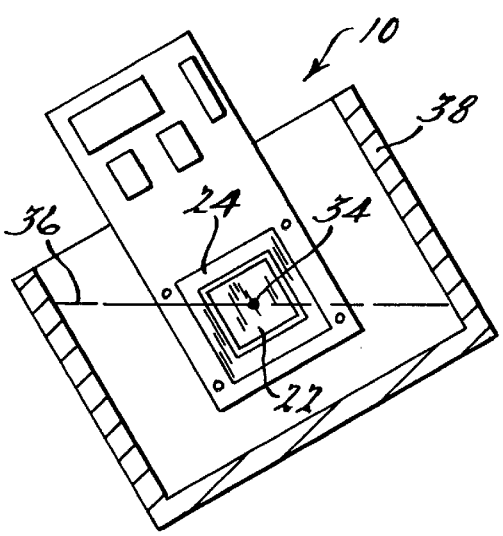
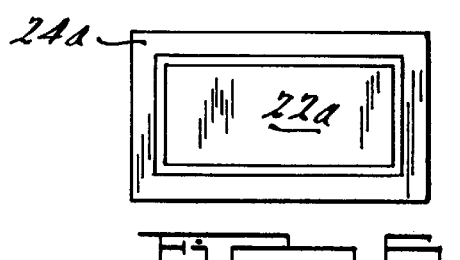
Fig. 5.  Fig. 6.
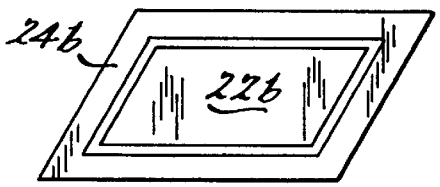
Fig. 7.
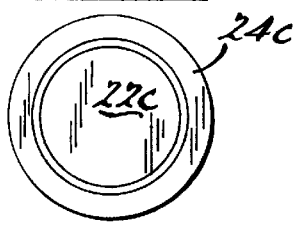 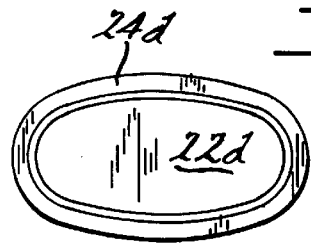 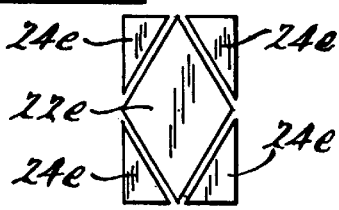
Fig. 8.  Fig. 9.  Fig. 10.
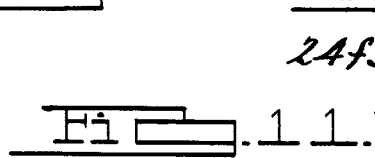 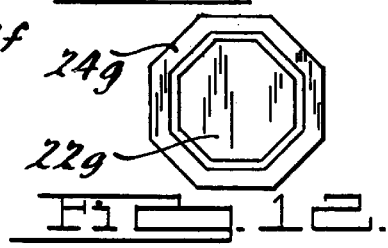
Fig. 11.  Fig. 12.

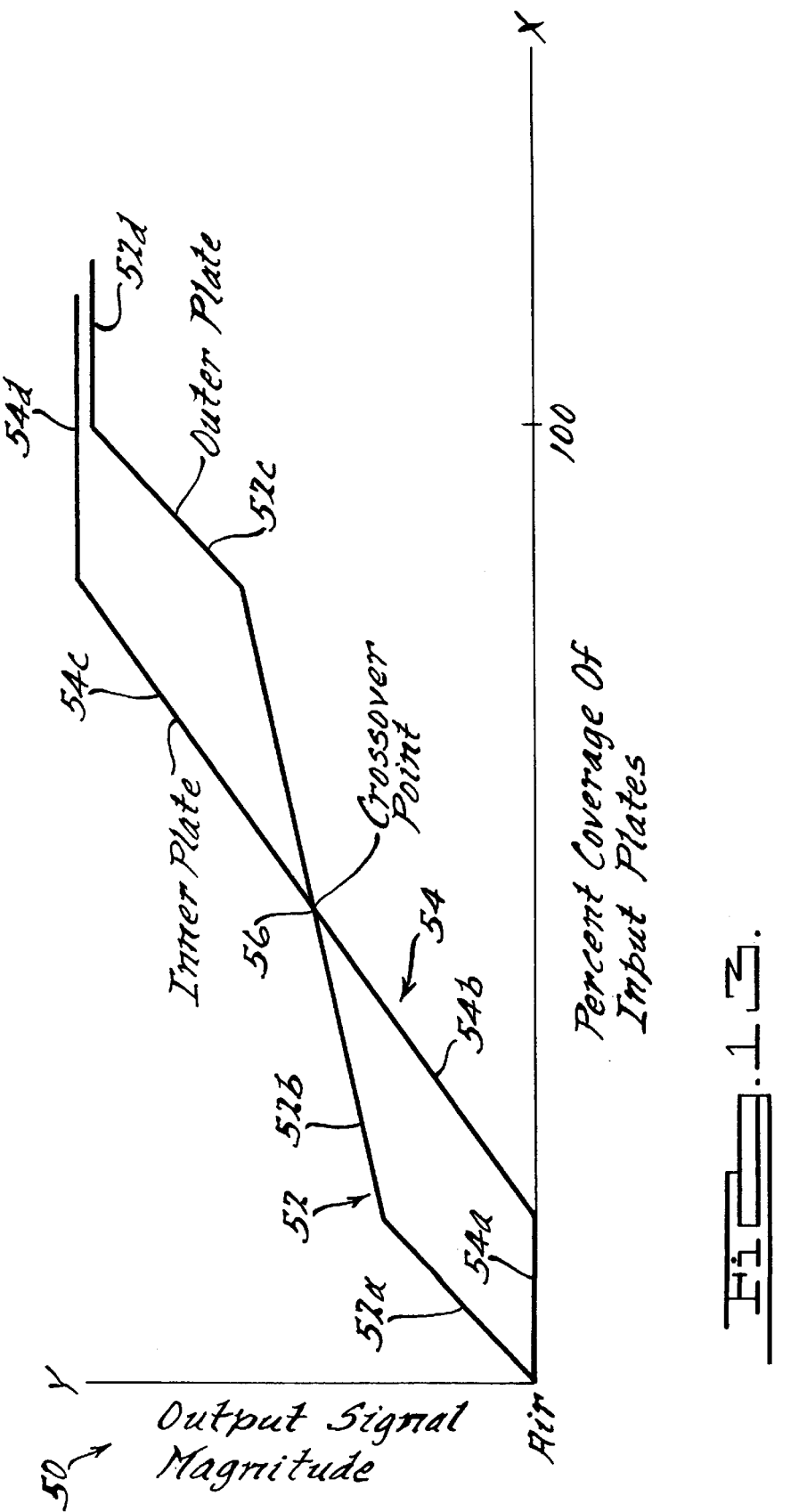

LIQUID LEVEL POINT SWITCH SENSOR

BACKGROUND OF THE INVENTION

1. Technical Field

This invention relates to liquid level sensors, and more particularly to a capacitive liquid level sensor for sensing the level of a liquid within a reservoir, where the sensor is generally immune to changes in the dielectric constant of the fluid and the orientation of the sensor about the center of the plates.

2. Discussion

Liquid level sensors are used in a wide variety of applications to detect the levels of fluids within various forms of reservoirs. Frequently, such sensors are employed in the automotive industry to sense the level of oil in an oil pan or sump, or the level of transmission fluid, just to name a couple of applications.

In many applications, and particularly in applications where the reservoir or sump is located on a moving vehicle such as an automobile, tractor or earth moving equipment, the vehicle will be required to traverse uneven ground which will cause the liquid in one or more reservoirs of the vehicle to shift. For example, when the vehicle begins moving up an incline, the orientation of the upper level of oil in an oil reservoir of the vehicle may change significantly. This in turn may cause an oil level sensor disposed in the oil reservoir to erroneously indicate that the oil level has changed (for example, decreased) to an unacceptable degree. In other words, the change in orientation may cause the level sensor to provide inconsistent and erroneous indications as to the true level of the oil in the reservoir.

It would therefore be highly desirable to incorporate a liquid level sensing device which is capable of accurately indicating when the level of a liquid in a reservoir has reached a predetermined point regardless of changes in the orientation of the reservoir.

It would also be highly desirable to provide a liquid level sensor which is relatively inexpensive to construct, highly reliable, relatively compact and lightweight, and readily usable in a wide variety of liquid level sensing applications with little or no modifications.

SUMMARY OF THE INVENTION

The present invention is directed to a method and apparatus for sensing when a liquid in a reservoir has reached a predetermined point, regardless of changes in the dielectric strength of the liquid. The liquid level sensor comprises a substrate in the form of a circuit board which includes an electrically conductive first input plate and an electrically conductive second input plate mounted thereon. An electrically conductive receiver or output plate is positioned closely adjacent the input plates but out of physical contact therewith. The first input plate is of a shape such that when an imaginary line is drawn through a centroid (i.e., geometric center) thereof at any angle, the imaginary line divides the first input plate approximately in half. The second input plate is positioned and shaped to nearly or completely circumscribe the first input plate. The second input plate further has a shape such that when the imaginary line extends through the centroid of the first input plate and also completely through the second input plate, the second input plate will also be divided approximately in half. The first and second input plates are also approximately equal in area.

The liquid level sensor further includes a controller for providing electrical signals, one at a time, to the first and second input plates to electrically excite the input plates and cause electrical signals to be coupled onto the receiver plate. The controller circuitry also monitors the output signals coupled onto the receiver plate. The output varies as the fluid level in the reservoir changes. This is because the dielectric constant changes when the receiver plate and the input plates are separated by air as compared to when they are separated by some liquid. Since the area of the first input plate and the second input plate are approximately equal, when the fluid level reaches (i.e., either increases or decreases) to the point where it is at the centroid of the first input plate, the output signals coupled onto the receiver plate as the first and second input plates are electrically excited will be approximately equal. Thus, by detecting when the signal coupled onto the receiver plate when the first input plate is electrically excited equals in magnitude the signal coupled onto the output plate when the second input plate is electrically excited, and further when the substrate is positioned within the reservoir such that the centroid is at the critical level to be detected, it can readily be determined when the fluid has reached the critical point in the reservoir.

The method of the present invention involves orientating first and second input plates within a reservoir, where the second input plate circumscribes the first input plate. The input plates are each of a shape which permits an imaginary line drawn through the centroid of the first input plate at any angle to divide both the first input plate and the second input plate in half. The first and second input plates are alternately electrically excited and the output signals are coupled onto a receiver plate also disposed in the reservoir closely adjacent the input plates. When the fluid level has reached the centroid of the first input plate the output signals coupled onto the output plate produced by electrically exciting the first and second input plates will be approximately equal. At this point a signal is generated indicating that the fluid level has reached the centroid of the first input plate.

The apparatus and method of the present invention provides fluid level monitoring which is uninfluenced by changes in the dielectric constant of the fluid being sensed. In some applications, the present invention may even provide level sensing which is immune to minor changes in the orientation of the reservoir relative to the ground.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a liquid level sensor in accordance with a preferred embodiment of the present invention;

FIG. 2 is a simplified block diagram of the liquid level sensor of FIG. 1;

FIG. 3 is a simplified side view of the liquid level sensor of FIG. 1 within a reservoir, where the level of the liquid is above the centroid of the first input plate of the sensor;

FIG. 4 is a view of the sensor of FIG. 3 showing the level of the liquid at the centroid; and FIG. 5 is a view of the sensor of FIG. 4 showing the sensor and the reservoir tilted at a severe angle, but where the upper level nevertheless intersects the centroid of the first input plate;

FIG. 6 illustrates a rectangular configuration for the input plates in accordance with an alternative preferred form of the invention;

FIG. 7 illustrates a parallelogram configuration for the input plates in accordance with an alternative preferred form of the invention;

FIG. 8 illustrates a circular configuration for the input plates in accordance with an alternative preferred form of the invention;

FIG. 9 illustrates an oval or elliptical configuration for the input plates in accordance with an alternative preferred form of the invention;

FIG. 10 illustrates a diamond shaped configuration of the sensor assembly;

FIG. 11 illustrates a hexagonal configuration for the input plates in accordance with an alternative preferred form of the invention;

FIG. 12 illustrates a octagonal configuration for the input plates in accordance with an alternative preferred form of the invention; and FIG. 13 is a graph illustrating how the output signals change as the fluid level changes to cross the centroid of the first input plate of the sensor.

DETAILED DESCRIPTION OF THE PREFERRED EMBODIMENTS

Referring to FIGS. 1 and 2, a liquid level sensor 10 is shown in accordance with a preferred embodiment of the present invention. The sensor 10 generally includes a substrate in the form of a printed circuit board 12 on which is mounted a microcontroller 14, an amplifier circuit 16 and a peak detector circuit 18. The microcontroller 14 comprises a microprocessor having an internal analog-to-digital converter (A/D converter) 14a, although it will be appreciated immediately that the A/D converter 14a could comprise a discreet component. A suitable connector 20 electrically enables the sensor 10 to be coupled to external devices such as light emitting diodes (LED's), relays, solenoid valves, etc, via a suitable electrical cable 21.

Referring further to FIG. 1, on the printed circuit board 12 is a first or inner input plate 22 within a second or outer input plate 24. Each of the input plates 22 and 24 are disposed in a common plane and formed from a relatively thin conductive material, and are electrically coupled to the microcontroller 14 via suitable traces (not shown) on the circuit board 12. The circuit board 12 is electrically coupled to a second substrate 26 via a single or a plurality of electrically conductive standoffs 28. Mounted on the second substrate 26 is an electrically conductive receiver or output plate 30. The second substrate 26 is coupled to the standoffs 28 such that the receiver plate 30 is positioned closely adjacent the first and second input plates 22 and 24 and in electrical communication with the standoffs 28. Although the spacing may vary considerably, in one preferred form of the present invention the spacing comprises a distance of preferably about 0.150–0.180 inches. Optionally, but preferably, the substrates 12 and 26 are coated with a protective coating such as plastic which makes the components on each of the substrates 12 and 26 impervious to corrosion which would otherwise be caused from direct contact with most fluids.

Referring further to FIG. 1a, the first input plate 22 and the second input plate 24 each have a shape such that an imaginary line 32 extending through the geometric center (i.e., centroid) 34 of the first input plate 22 at any angle divides the first input plate 22 approximately in half. The second input plate 24 is also arranged on the substrate 12 relative to the first input plate 22, and preferably concentrically with the first input plate 22, such that when the imaginary line 32 extends through the centroid 34 of the first input plate 22 and through the second input plate 24 at any angle the second input plate 24 will also be divided approximately in half. The input plates 22 and 24 also are dimensioned such that the total area of each is approximately the same. It will be appreciated immediately that while the first and second input plates 22 and 24, respectively, are shown as having generally square shapes, that a wide variety of other shapes are possible. Various other configurations are illustrated in FIGS. 6–12. In FIG. 6, a rectangular configuration for first and second input plates 22a and 24a is illustrated. In FIG. 7 a parallelogram configuration for first and second input plates 22b and 24b is illustrated. FIG. 8 shows another alternative configuration where first and second input plates 22c and 24c each comprise a generally circular shape. FIG. 9 shows a configuration where first and second input plates 22d and 24d each comprise a generally oval or elliptical shape. FIG. 10 shows first and second input plates 22e and 24e as having a generally diamond shape. FIG. 11 shows input plates 22f and 24f as having a generally hexagonal shape. FIG. 12 shows input plates 22g and 24g having an octagonal configuration. It will be appreciated, however, that a wide variety of other sensor configurations could be employed. The only requirement is that the shape of the first and second input plates 22 and 24 be such that when the second input plate 24 is positioned concentrically with the centroid of the first input plate, that an imaginary line extending through the centroid of the first input plate 22, and also completely through the second input plate, at any angle, will cause each of the first and second input plates (surface area) to be divided approximately in half.

With further reference to FIG. 1, the first and second input plates 22 and 24 are required to have approximately the same total surface area. Accordingly, when the imaginary line 32 extends through the centroid 34 of the first input plate 22 at any angle, the total area of each of the input plates 22 and 24 will not only be cut in half, but the total area of each input plate 22 and 24 above and below the imaginary line 32 will also be approximately equal to one another.

Referring now to FIG. 2, the sensor 10 detects changes in the level of a liquid 36 within a fluid reservoir 38 by detecting the change in capacitance that occurs when the input plates 22 and 24 are electrically excited and signals are coupled onto the receiver plate 30. The signals coupled onto the receiver plate 30 will vary because the dielectric constant of air and the liquid 36 are different. Thus, depending upon the portion of the first and second input plates 22 and 24 submerged in the liquid 36, it can be detected when the upper level of the liquid 36 reaches a predetermined point in the reservoir 38.

With further reference to FIGS. 1 and 2, initially it will be appreciated that the sensor 10 is oriented in the reservoir 38 such that the centroid 34 of the first input plate 22 is at a predetermined point in the reservoir 38 representative of some critical fluid level. The critical fluid level may be a lower limit, an upper limit or some level therebetween. The microcontroller 14 generates electrical pulse signals which are applied alternately to the first and second input plates 22 and 24, respectively. These electrical pulses each cause output signals to be coupled onto the receiver plate 30. The magnitude of these output signals will depend on the percentage of area of each of the first and second input plates 22 and 24, respectively, which is submerged in the liquid 36. The greater the percentage of coverage of the input plates 22, 24 the larger in magnitude will be the output signals coupled onto the receiver plate 30. The output signals are amplified by amplifier 16 and a peak detector 18 generates a signal indicative of the peak magnitude of each of the output signals coupled onto the receiver plate 30. The output of the peak detector 18 is provided to an input of the microcontroller 14 where the A/D converter thereof converts the peak signals into corresponding digital values. Microcontroller 14 continuously compares the output signals from the peak detector 18 to determine when the output signals become approximately equal to one another in magnitude. When the output signals become approximately equal to one another, the upper level of the liquid 36 in the reservoir will be such that it is bisecting the first input plate 22. From this the microcontroller 14 can detect that the upper level of the liquid 36 in the reservoir 38 is at the critical point, and then generates an output signal to an external device 44 such as an LED, a relay, solenoid valve, etc., or any other form of device which may need to be activated to inform one that the fluid 36 in the reservoir 38 has reached the predetermined critical level. Other forms of controller systems which could be adapted for use in monitoring the output signals coupled onto the output plate 30, with minor modifications, are disclosed in U.S. Pat. Nos. 5,406,843 and 5,437,184, assigned to the assignee of the present application, and hereby incorporated by reference into the present application.

From the above description it will be appreciated that since the microcontroller 14 is concerned principally with determining when the input signals applied to the input plates 22 and 24 result in output signals being coupled onto the receiver plate 30 which are approximately equal in magnitude, that changes in the dielectric constant of the fluid do not appreciably affect the accuracy or sensitivity of the sensor 10 in detecting when the fluid level has reached the critical point or throughout the whole process. Additionally, since the input plates 22 and 24 are shaped such that the upper level of the liquid will divide each plate approximately in half when the upper level reaches the centroid 34, the actual orientation of the input plates 22 and 24 within the reservoir 38 will not affect the microcontroller's 14 ability to detect when the upper level of the liquid 36 has reached the critical point within the reservoir 38. This is illustrated briefly in FIGS. 3–5. In FIG. 3, the upper level of the liquid 36 is shown clearly above the centroid 34 of the first input plate 22 when the reservoir 38 is level. In FIG. 4, the upper level of the liquid 36 is at the centroid. From FIG. 4 it can be seen that the upper level of the liquid divides each of the first and second input plates 22 and 24, respectively, in half. In FIG. 5 it can be seen that even if the reservoir 38 and sensor assembly 10 are tilted at a severe angle, such as when a vehicle is climbing an incline, the upper level of the liquid 36 will still bisect the centroid 34, and thus the microcontroller 14 will still be able to accurately determine that the upper level of the fluid 36 is at the centroid 34, provided the sensor assembly 10 is disposed at the center of the reservoir 38, and that the reservoir is not irregularly shaped. Thus, the sensor apparatus 10, in some applications, will also be generally immune to changes in the orientation of the reservoir 38 which might pose problems for other forms of liquid level sensors.

It will be appreciated that while the foregoing description has made reference to the sensor 10 being applicable for use in vehicles, the sensor 10 of the present invention is not limited to just land vehicles. The sensor 10 is equally applicable to aircraft and marine applications, and virtually any other application where it is important to detect when a fluid level has reached a predetermined point within a reservoir. The sensor 10 of the present invention is particularly well adapted for applications where the fluid is or may become corrosive or contaminated such that the dielectric constant of the fluid changes. Since the sensor 10 of the present invention does not compare the output signals relative to a fixed reference capacitance, its accuracy is not affected by changes in the dielectric constant which could occur when the fluid becomes contaminated.

The sensor 10 of the present invention further does not require modification or recalibration depending upon whether an increasing or decreasing fluid level is being sensed. Whether the sensor 10 is being used in an application where it is desired to determine when a fluid level within a reservoir has increased to a certain predetermined point or has decreased to a certain predetermined point, the sensor 10 is able to detect when the fluid level reaches the predetermined point provided the centroid of the first input plate is orientated such that it is positioned at the predetermined point in the reservoir. The sensor 10 thus forms a reliable, relatively small and inexpensive means for detecting when a fluid level in a reservoir has either increased or decreased to a predetermined point, and in some cases regardless of whether the reservoir is tilted or otherwise changes its orientation from an initial or rest position depending on the positioning of the sensor 10 within the reservoir and the shape of the reservoir.

Referring now to FIG. 13, a graph 50 is illustrated which shows how the magnitudes of the output signals converge to the point of being equal to one another when the fluid 36 in the reservoir 38 reaches the centroid 34 of the first input plate 22. The X-axis represents the fluid level and the Y-axis represents the magnitudes of the output signals generated by pulsing the first and second input plates 22 and 24 respectively. When both input plates 22, 24 are in air, the magnitudes of the output signals will be at a minimum value, but will be equal to each other. In this regard, it will be appreciated that the controller would need to be programmed to recognize that when the output signals are equal but at a predetermined minimum value, that both plates 22, 24 will be positioned in air. Alternatively, the sensor 10 could be positioned so that the second input plate 24 will always be disposed at least partially in fluid in the reservoir 38.

As the fluid level rises in the reservoir 38, a greater percentage of the second input plate 24 becomes submerged, which causes a corresponding increase in the magnitude of the output signal 52, as indicated by portion 52a thereof. Since the first input plate 22 is not yet submerged, its output signal 54 stays steady at a minimum level, as indicated by portion 54a thereof. Once the fluid level reaches and begins to cover the first input plate 22, its output signal begins to increase, as indicated by portion 54b. At about this point the rate of increase in the output signal generated from the second input plate 24 begins to decrease, as indicated by portion 52b. This is because, in this example, only the vertical portions of the second input plate are now being covered, rather than the lower horizontal portion, which causes the rate of change of the increase of the area of the second input plate 24 being covered to decrease.

At point 56 the magnitudes of the output signals generated by the input plates become approximately equal. From this condition the microcontroller 14 determines that the upper level of the fluid 36 has reached the centroid 34 of the first input plate, and is therefore at the critical point in the reservoir.

As the fluid level increases, the increase in the magnitude of the output signal generated by pulsing the first input plate continues to increase, as indicated by portion 54c, to a maximum level 54*d*, at which point the first input plate 22 is completely covered by fluid. A further increase in the fluid level does not cause an increase in the output signal generated from pulsing the first input plate 22. At this point the upper horizontal portion of the second input plate begins to be covered by the fluid 36, which causes an increase in the rate of change of the output signal generated by pulsing the second input plate 24, as indicated by portion 52*c*. Once the second input plate 24 is completely submerged, its output signal does not increase any further, and is approximately equal in magnitude to the first input plate output signal, as indicated by portion 52*d*. To avoid the situation where the output signals at portions 52*d* and 54*d* are equal, input plate 22 could be made slightly larger in total area than the input plate 24. The maximum output signals generated by each would then not be equal. This could help simplify programming of the microcontroller 14 because the condition of equal, maximum output signals would never exist during operation of the sensor 10.

It will also be appreciated that one or more grounded plates are preferably embedded in the circuit board 26 to minimize or eliminate the affects of external or stray signals which might be conducted to the receiver plate 30 by the conductivity of the fluid 36.

In the instance where the reservoir 38 is metal and grounded, and the electrical conductivity of the fluid is high, a condition might exist where a portion of the signals generated by the input plates 22, 24 are "lost" because they are conducted by the fluid to the grounded reservoir 38 rather than to the receiver plate 30. In this instance, the sensor 10 is still able to operate reliably because it is principally detecting when the capacitive output signals generated from the input plates are equal to one another. Hence, a partial or even significant loss of signal strength does not affect its operation and/or reliability.

It will also be appreciated that a degree of hysteresis could be introduced to eliminate or substantially reduce the possibility of noise affecting the accurate detection (i.e., sensing) of the threshold point. Furthermore, it will be appreciated that a non-metallic object slid between the receiver plate 30 and the input plates 22, 24 could be used in place of the fluid 36 to signal a point at which a threshold has been reached.

It will also be appreciated that by comparing the magnitudes of the output signals coupled onto the output plate 30, the microcontroller 14 can determine and keep track of the time that the fluid level is above or below the critical level and provide a signal to an external device such as an LED, solenoid, etc., signalling this condition.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A liquid level sensor adapted to be disposed within a reservoir, comprising:
   a first input plate having a shape such that an imaginary line extending through a centroid thereof at any orientation divides said input plate approximately in half;
   a second input plate disposed adjacent said first input plate so as to at least partially circumscribe said first input plate without physically contacting any portion of said first input plate, said second input plate having a shape and being orientated such that when said imaginary line extends through said centroid of said first input plate and through said second input plate, said imaginary line also divides said second input plate in half;
   a circuit to apply an electrical signal to said first and second input plates;
   a receiver plate for receiving output signals from said first and second input plates; and
   said circuit also for determining when the magnitude of output signals from said first and second input plates are approximately equal, to thereby determine when an upper level of said liquid is at said centroid and therefore at a said predetermined point within said reservoir.

2. The liquid level sensor of claim 1, wherein said first and second input plates are approximately equal in area.

3. The liquid level sensor of claim 1, wherein said receiver plate is positioned adjacent said first and second input plates within said reservoir so as to allow said liquid to occupy a space between said first and second input plates and said receiver plate.

4. The liquid level sensor of claim 1, wherein said circuit applies electrical signals to said input plates to electrically excite said input plates, one at a time.

5. A liquid level sensor, comprising:
   a first input plate having a shape such that an imaginary line extending through a centroid thereof at any orientation divides said input plate approximately in half;
   a second input plate disposed adjacent said first input plate so as to at least partially circumscribe said first input plate without physically contacting any portion of said first input plate, said second input plate having a shape and being orientated such that when said imaginary line extends through said centroid of said first input plate and through said second input plate, said imaginary line also divides said second input plate approximately in half, the area of said first input plate and said second input plate further being approximately equal;
   a receiver plate positioned adjacent said first and second input plates, said input plates being disposed in a liquid within a reservoir; and
   a circuit for applying electrical signals to said input plates, one at a time, and determining the magnitude of capacitive signals coupled onto said receiver plate in response thereto, and for determining when said capacitive signal generated by an electrical signal applied to said first input plate approximately equals the capacitive signal generated by an electrical signal applied to said second input plate, to thereby determine when a level of said liquid within said reservoir is at said centroid.

6. The apparatus of claim 5, wherein at least one of said first and second input plates is shaped in the form of a square.

7. The liquid level sensor of claim 5, wherein at least one of said first and second input plates is shaped in the form of a circle.

8. The liquid level sensor of claim 5, wherein at least one of said first and second input plates is shaped in the form of a pentagon.

9. The liquid level sensor of claim 5, wherein at least one of said first and second input plates is shaped in the form of a hexagon.

10. The liquid level sensor of claim 5, wherein at least one of said first and second input plates is shaped in the form of an octagon.

11. The liquid level sensor of claim 5, wherein at least one of said first and second input plates is shaped in the form of a rectangle.

12. The liquid level sensor of claim 5, wherein said circuit comprises:
   a microprocessor for applying said electrical signals to said first and second input plates and for reading signals coupled onto said receiver plate.

13. The liquid level sensor of claim 5, wherein said circuit further comprises:
   an amplifier for amplifying output signals coupled onto said receiver plate;
   a peak detector circuit for converting an output signal from said amplifier into a DC peak level signal;
   an analog-to-digital converter for converting said DC peak level signal into a corresponding digital value; and
   wherein said microprocessor uses said digital value to determine when the capacitive signal coupled onto said receiver plate by said first input plate equals the capacitive signal coupled onto said receiver plate by said second input plate.

14. The liquid level sensor of claim 5, further comprising:
   a substrate; and
   wherein said first and second input plates are mounted on said substrate in a common plane.

15. A liquid level sensor adapted to be disposed in a liquid reservoir for detecting when said liquid in said reservoir reaches a predetermined point, said liquid level sensor comprising:
   a substrate;
   a first input plate disposed on said substrate, said first input plate having a shape such that an imaginary line extending through a centroid thereof at any orientation divides said input plate approximately in half, said centroid further being disposed at said predetermined point in said reservoir;
   a second input plate disposed adjacent said first input plate on said substrate so as to substantially circumscribe said first input plate without physically contacting any portion of said first input plate, said second input plate having a shape and being orientated such that when said imaginary line extends through said centroid of said first input plate and through said second input plate at any orientation, said imaginary line also divides said second input plate approximately in half, the area of said first input plate and said second input plate further being approximately equal;
   a receiver plate spaced apart from said first and second input plates and having dimensions sufficient to overlay substantially the entire area of each of said first and second input plates; and
   a circuit for applying electrical signals to said input plates, determining the magnitude of capacitive signals coupled onto said receiver plate as said input plates are electrically excited, and for determining when a capacitive signal coupled onto said receiver plate by an electrical signal applied to said first input plate equals a capacitive signal coupled onto said receiver plate in response to the application of an electrical signal to said second input plate, to thereby determine when a level of said liquid within said reservoir reaches said predetermined point within said reservoir defined by said centroid.

16. The liquid level sensor of claim 15, wherein said circuit comprises:
   a microprocessor for generating said electrical signals applied to said first and second input plates;
   an amplifier for amplifying said signals coupled onto said receiver plate;
   a peak detector circuit for converting said signals to peak DC level signals; and
   an analog-to-digital converter for converting said peak DC level signals to corresponding digital values;
   wherein said microprocessor uses said digital values to determine when said signals coupled onto said receiver plate as a result of electrically exciting said first and second input plates are approximately equal to each other.

17. The liquid level sensor of claim 15, wherein at least one of said first and second input plates comprises a square shape.

18. The liquid level sensor of claim 15, wherein at least one of said first and second input plates comprises a circular shape.

19. The liquid level sensor of claim 15, wherein at least one of said first and second input plates comprises an oval shape.

20. The liquid level sensor of claim 15, wherein at least one of said first and second input plates comprises a rectangular shape.

21. The liquid level sensor of claim 15, wherein at least one of said input plates comprises an octagonal shape.

22. The liquid level sensor of claim 15, wherein at least one of said first and second input plates comprises a hexagonal shape.

* * * * *